(12) United States Patent
Walz et al.

(10) Patent No.: US 6,322,871 B1
(45) Date of Patent: *Nov. 27, 2001

(54) METHOD OF TREATING CERAMICS FOR USE AS TIPS IN SAWS AND OTHER TOOLS OR OTHER STRUCTURES

(75) Inventors: Thomas J. Walz, Tacoma; Issak S. Rossovsky, Edmonds, both of WA (US)

(73) Assignee: Northwest Research Institute, Inc., Tacoma, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,702

(22) Filed: Oct. 2, 1998

(51) Int. Cl.$^7$ .................................................. B23K 31/02
(52) U.S. Cl. ......................... 428/122; 228/121; 228/124; 228/122.1
(58) Field of Search ................................... 228/121, 122, 228/124, 122.1

(56) References Cited

U.S. PATENT DOCUMENTS

| | | | | |
|---|---|---|---|---|
| 4,352,714 | * | 10/1982 | Patterson et al. | 156/626 |
| 4,871,108 | * | 10/1989 | Boecker et al. | 228/122 |
| 4,931,102 | * | 6/1990 | Burke | 134/2 |
| 5,054,682 | * | 10/1991 | Mistry | 228/124 |
| 5,058,799 | * | 10/1991 | Zsamboky | 228/124 |
| 5,523,158 | * | 6/1996 | Kapoor et al. | 51/307 |

* cited by examiner

*Primary Examiner*—Archene Turner
(74) *Attorney, Agent, or Firm*—Robert B. Hughes; Hughes Law Firm

(57) ABSTRACT

A method of processing a ceramic body, such as a saw tip so that the ceramic body can be bonded to a substrate, such as a saw blade. The ceramic body is desirably a cermet, and it is first cleaned, preferably using sodium hydroxide. After this, the ceramic body is etched by an acid, after which a metallic coating is applied to the bonding surface either by electrolysis by an electroless process. Then the ceramic body is either brazed or welded to the substrate.

28 Claims, 1 Drawing Sheet

METHOD OF TREATING CERAMICS FOR USE AS TIPS IN SAWS AND OTHER TOOLS OR OTHER STRUCTURES

BACKGROUND OF THE INVENTION a) Field of the Invention

This invention relates to a method of brazing or welding a ceramic body, such as a saw tip or other object, to a substrate such as a saw blade tip. The present invention also relates to the ceramic body itself which is processed in a particular manner so that it can be brazed or welded to a substrate, and also to an article made up of such a ceramic body joined to a substrate.

b) Background Art

Ceramics have attributes such as high wear and corrosion resistance as well as stability at high temperature that make their use desirable in applications such as saws, tools and jet engine exhausts, and in other applications where similar conditions exist.

The very qualities that make ceramics desirable for use in these applications also make them very hard to use. Resistance to wear, heat and corrosion make them very difficult to braze or weld successfully. Currently it is possible to braze ceramics using special alloys in special atmospheres and with elaborate preparation. Preparing ceramics for plating and brazing is well known in industries such as electronics and aerospace. The drawbacks have been that the special atmospheres and special alloys also made the joining very expensive in terms of materials, quipment and overall processing costs. In addition the epoxies and alloys suitable for brazing ceramics are typically too weak and break down at temperatures too low to make their use, practical in many applications. Active metal alloys, catalytic surface treatment, special atmospheres and multi-step processing all add to the cost of the processing in an extremely price sensitive industry.

Brazing is commonly defined as a process for joining two dissimilar materials at a temperature in the range of, or above, 800° F. The brazing alloys which are commonly used are silver based because of their strength, impact resistance and corrosion resistance, and quite commonly in the temperatures in the range 1150° F. to 1350° F. are employed in the brazing process. The brazing can be accomplished by various heating means, such as utilizing oxyacetylene, induction brazing or resistance brazing. It is also possible that could be accomplished in an oven, or with plasma. The more common methods are simply to use an oxyacetylene torch or induction brazing.

Another process of joining two metals together is called welding where the two metal objects are placed in contact with one another without the use of a separate brazing alloy, and heat is applied so that the two metals flow together and upon cooling become joined to one another.

One application of brazing in connection with a ceramic like material is brazing tungsten carbide saw tips to a circular saw blade. The saw blade is made of a high quality steel, and plurality of notches are formed in the perimeter of the saw blade. The tungsten carbide tips are formed in the desired configuration, with these tips have a bonding surface matching the configuration of the notches in the saw blade.

The bonding surfaces of the notches in the saw blade and of the tips are properly prepared to remove contaminants, and a brazing compound is applied to the bonding surface of the tips.

The tips are placed in the notches of the saw blade, and heat is applied. The assembly of the saw blade with the tips is permitted to cool, to form a completed circular saw with the tips securely joined to the saw blade.

When the welding process is employed, the brazing compound is not used. In other respects, the welding process is similar to the brazing process.

The tungsten carbide tips are quite durable and are able to withstand relatively high temperatures. Thus, for high quality saws that need to operate in more severe environments (higher temperature, vibration, impacts, etc.), tungsten carbide tips have commonly been used.

It has long been recognized that saw tips made of cermet have certain qualities which surpass those of tungsten carbide. First, cermets are highly resistant to various corrosive materials. This makes use of cermets quite desirable when the saw blades are commonly used to cut cedar, spruce, hemlock and other green lumber, since these types of wood have acids that can corrode the saw blade, the saw tips and the bonding material. Further, a cermet saw tip, made (for example) from titanium carbonitride is able to maintain a sharper edge for as much as three times as long or longer than a comparable tungsten carbide saw tip. Also, a tip made of titanium carbonitride tip is able to withstand higher temperatures, and maintain a sharp edge.

However, in general it has not been possible to achieve the benefits which could be achieved by using saw tips made from a cermet material, mainly because of the difficulty of reliably bonding the cermet to the saw blade. In general the epoxies and alloys which are more suitable for brazing ceramics or cermets are too weak and also break down at temperatures too low to make them commercially practical for many applications.

Thus, when ceramics (including cermets) have been used, it is commonly in indexable or mechanically held applications in tools. For example, they can be used in a rotary cutting tool where the cutter inserts are placed in a pocket at the perimeter of the tool and mechanically held in place. However, to the best knowledge of the applicants, it has not been found to be commercially practicable to employ cermets where they must be brased or otherwise bonded to the saw blade or other substrate.

SUMMARY OF THE INVENTION

It is an object of the present invention to provide a commercially feasible process for joining ceramic parts to a substrate in a commercially viable manner so that the process has a desirable balance of advantageous features, such as, high bond strength at high temperatures, resistance to hostile environments (e.g. contact with corrosive materials, to high impact, subject to residual stresses and vibration, etc.), low cost, being able to accomplish the process rapidly and simply, and being an environmentally desirable process. The present invention uses chemicals which are more commonly available, allows for brazing using standard alloys, and also using these at ambient temperatures.

It is a further object to provide a process whereby ceramics can be prepared so that high temperature/high strength/low cost alloys (such as silver and copper based alloys) can be used easily and well, thus allowing their use in applications such as cutting tools, wear parts and high temperature linings such as in jet engine exhausts.

In the method of the present invention, the ceramic body is provided so as to have a clean surface which is substantially free of contaminants. This is followed by an etching step where the bonding surface of the ceramic body is etched. Then there is applied to this ceramic bonding surface a coating of a metallic material capable of being applied as a surface layer to the ceramic bonding surface and being bonded to this ceramic bonding surface. Then bonding is accomplished by either of two ways, namely;

i) placing the bonding surfaces of the ceramic body and the substrate against one another with the brazing material therebetween and bonding these to one another by a bonding process, or ii) placing the bonding surfaces of the ceramic body and the substrate against one another and bonding these to one another by a welding process.

The cleaning step is desirably accomplished by electro cleaning. More specifically, the ceramic body is immersed in an electrolytic solution, and the ceramic body is connected one of two electrodes in the electrolytic solution. A current is passed between the electrodes. The electrolytic solution is desirably an alkaline solution which comprises, at least in part, sodium hydroxide, potassium hydroxide, or combinations thereof.

The etching is accomplished by an etching agent which comprises primarily an inorganic acid or a combination of inorganic acids. More specifically, the etching agent is selected from a group consisting of hydrochloric acid, hydrofluoric acid, sulfuric acid, nitric acid, and combinations of these.

The metallic coating material comprises, at least in part, a metal that is selected from a group comprising cobalt, copper, nickel, zinc, silver, and combinations thereof. In the preferred form, the application of the metallic coating is accomplished by electrolysis, and the electrolyte for the electrolytic deposition is selected from a group comprising; ammonium cobalt chloride, cobalt chloride, cobalt sulfate, nickel sulfate, ammonium nickel sulfate, a zinc based solution, a cobalt based solution, a nickel based solution, and combinations thereof.

Alternatively, the application of the metallic coating can be accomplished by an electroless process.

Preferably the ceramic body comprises a metal based ceramic, and more particularly a cermet. The cermet body may comprise:

i) titanium, aluminum, tungsten, silicon, and/or combinations thereof; and ii) carbon, nitrogen, oxygen and/or combinations thereof. A preferred composition of the ceramic body is one that comprises titanium, aluminum, and/or combinations thereof. More specifically, the ceramic body comprises titanium carbide, tungsten carbide, titanium carbonitride, titanium nitride, aluminum oxide, and/or combinations thereof.

Desirably after the application of the coating of a metallic material, the ceramic bonding surface is treated with a passivation solution comprising an acid. The acid in the preferred form comprises hydrochloric acid, sulfuric acid, and combinations thereof.

In a preferred embodiment, the ceramic body is a saw tip and the substrate is a saw blade. Also, the present invention can be used where the ceramic body is used in tools, such as drills, routers, shapers and similar applications; in high stress applications such as wear parts and scrapers; and in high temperature applications such as ovens, kilns, and jet exhaust; and in cotton gins. Further, the invention comprises a bonded structure made up of the ceramic body and the substrate, which has been joined in according with the process of the present invention. This structure can be bonded either by a bonding process, or by a welding process.

The present invention also comprises a ceramic body which has been process in accordance with the steps of the present invention, after which the ceramic body can be used by bonding it to a substrate as described above.

Other features of the present invention will become apparent from the following detailed description.

DESCRIPTION OF THE PREFERRED EMBODIMENTS

Figure 1:
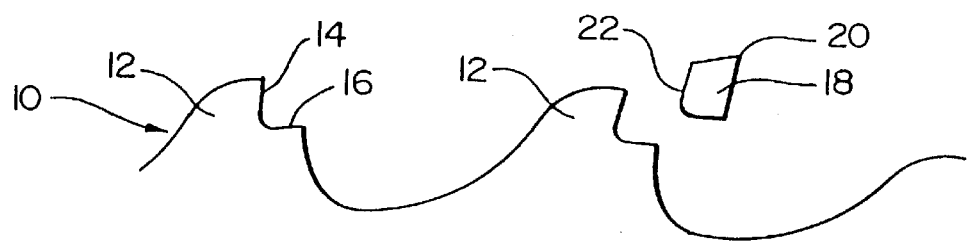
FIG. 1 is a side elevational view showing a perimeter portion of a saw blade, with a saw tip being positioned adjacent to a notch in the saw blade as a preliminary step in the brazing operation.

The present invention will be described specifically as it applies to the brazing or welding of ceramic (more specifically cermet) saw tips to a saw blade. However, within the broader scope of the present invention, it will be recognized that the present invention could also be applicable to other applications, and particularly applications which have more stringent operating environments where the present application would be particularly advantageous (e.g. tools, such as drills, routers, shapers and other similar tools; wear parts and scrapers in high stress application; cotton gins; ovens, kilns, jet exhausts and other similar structures).

With reference to FIG. 1, there is shown a perimeter portion of a saw blade 10 having a plurality of tooth sections 12, with each tooth section being formed with a notch 14 with a bonding surface 16. For each tooth section 12 there is a saw tip 18 with a cutting edge 20 and a bonding surface 22 matching the bonding surface 16 of the saw tooth. The tips 18 are positioned in the notches and the bonding surfaces of the tips 18 and the notches are bonded to one another.

In general the ceramic body (in this specific disclosure the saw tip) is made of a ceramic material (more desirably a cermet) and is formed in the desired shape (i.e. as a saw tip) by conventional manufacturing techniques. The saw tip is cleaned (e.g. by immersing the saw tips in a cleaning bath), and then etched (e.g. by being placed in a cleaning/etching solution). The ceramic tips then have a layer of a suitable metallic material placed thereon (desirable by electroplating or electroless plating) so that a wettable, brazeable surface is formed allowing the use of standard braze alloys, such as AWSB BAg alloys or a surface suitable for welding.

In the preferred form of the present invention, the ceramic material by which the saw tip (or other body) is made is a metal based ceramic, such as those based on tungsten, titanium, aluminum, silicon and possibly other metals, joined with carbon, nitrogen and other similar materials or combinations thereof, such as TiCN, WC, TiCN (also as TiC/TiN) $Al_2O_3Si_3N_4$, SiC and others. The steps of the process can be summarized as follows.

The overall process of the present invention for preparing the ceramic body is as follows:

1. The part is thoroughly cleaned.

2. The part is then treated in such a manner as to prepare the surface to bond with an intermediate material. Typically this is a chemical bath and may or may not use electric current. The surface is roughened and chemically activated.

3. The surface is then plated with a metal or other material that will bond to the ceramic as well as forming a layer suitable for brazing with standard alloys or welding. Typically this is also done in a chemical bath and may or may not use electric current.

4. If needed, the part may be cleaned or otherwise passivated if desired.

Then to carry the invention further to complete the bonding of the ceramic body to the substrate, the above steps are followed by a welding or brazing step.

Best Mode for Carrying Out The Invention

In a preferred form of the invention a ceramic part such as a cermet or titanium carbonitride is preferred for use as a saw tip.

Step 1 Cleaning

Purpose: To remove all stains, oil, dust, etc. and to create additional roughness on the surface.

A preferred method of cleaning is a cathodic electro cleaning process in alkaline solution as discussed in patent U.S. Pat. No. 5,624,626. The ceramic part is connected to the negative terminal of the rectifier and a stainless steel rod is used as an anode connected to the positive charge.

The solution is 15% sodium Hydroxide

Temperature is 150°–160° F.

Voltage 5–6 v

Time 5–7 minutes

Alternatively the cleaning could be done without electric current. Also potassium hydroxide could be used.

Step 2 Surface Etching

The part is immersed in a solution for an etching effect. One such solution is 20% Hydrochloric acid solution (HCl) or other solution depending on the material and other considerations such as cost and safety.

Temperature—ambient 70°–80° F.

Time 5 minutes

This process may be accelerated or enhanced by the use of electric current, higher temperature or different combinations of chemicals.

Step 3 Deposition of Cobalt or Other Metal

The parts to be treated are connected to the negative side of a rectifier. An anode such as stainless steel, cobalt or other appropriate material is used.

A 17.5% solution of Ammonium Cobalt Sulfate $(NH_4)_2Co(SO_4)_2$ in water is used. Other cobalt compounds, such a Cobalt Chloride and Cobalt Sulfate, maybe used and compounds based on other metals such as Titanium may also be used.

Temperature—ambient 70°–80° F.

Current density 5–15 amp/sq. Ft.

pH 5 to 5.5

Time is a variable depending on the thickness of coating desired and the number and size of the parts.

The elapsed time that the Ceramic body is treated to the electrical potential difference should be sufficient to pre-treat the ceramic body for use in the method of the present invention. The preferred elapsed time may vary depending upon the composition of the ceramic body, the magnitude of the electrical potential difference, and the composition of the solution in the bath. However, for most applications, the elapsed time in which the electrical potential difference is imposed across the electrolytic cell may be between about one (1) minute and about five (5) minutes. In a more preferred form of the invention, the elapsed time is between about two (2) minutes and about three (3) minutes.

The preferred electrical potential difference may vary depending upon the composition of the ceramic body the amount of time that the ceramic body is in the bath, and the composition of the solution in the bath. However, for most applications, the difference in electrical potential imposed across the electrolytic cell may be between about two (2) volts and about fifteen (15) volts. In a more preferred form of the invention, the difference in electrical potential is between about five(5) volts and about ten (10) volts. And, in an even more preferred form of the invention, the electrical potential difference is about six (6) volts.

Cobalt or other appropriate anode may be used to replenish the bath.

Step 4 Post Cleaning of the Parts

The parts are desirably post cleaned by dipping in a solution such as 20% HCl for 30 to 60 seconds.

Once this process is performed the parts may then be brazed on saws using standard braze alloys and will work successfully in sawing and other applications. Alternatively, a welding process could be used.

The method of the present invention is particularly useful for treating a ceramic body, such as a Titanium Carbonitride (cermet) to provide a surface on the ceramic body, which is wettable by a silver brazing alloy. When silver brazing alloy is applied to the surface of an untreated ceramic body, the brazing alloy forms a globule on the surface instead of flowing evenly and completely across the surface. Joints formed by a globule of alloy are generally not as uniformly strong for most industrial applications, such as adhering tips to a circular saw plate. The present invention provides a treated surface on a ceramic saw tip, which is readily wettable by a silver brazing alloy compound. The brazing compound flows evenly and completely across the surface of the tip such that a uniformly strong joint is formed between the ceramic tip and the circular saw plate. In addition, a body treated according to the method of the present invention remains clean and wetable such that the body may be stored and processed at a later time.

With regard to the ceramic materials which are to be bonded to a substrate, within the very broad scope of the present invention, it is conceivable that a wide variety of such ceramic materials would be found suitable. In general, the ceramics which are metal based ceramics are believed to be in general better adapted for use in the present invention. Titanium, aluminum, tungsten, and/or silicon and combinations thereof in combination with carbon, nitrogen, oxygen and combinations of these would be found suitable. Further, ceramics based on titanium, aluminum and combinations thereof have been found to work particularly well in the present invention. Specific examples of these are titanium carbonitride, titanium carbide, and also aluminum oxide enriched with titanium carbide. It would also be possible to use combinations of the these and also to add other ingredients thereto.

As indicated previously, a first step in the present invention is properly cleaning the surface of the ceramic body. It is conceivable that the ceramic body would be provided with the bonding surface thereof freshly cleaned and ready for use, in which case the first step of the present invention would be simply providing such cleaned ceramic pieces. However, this is usually not the case.

As indicated previously, the preferred method of cleaning is use of an alkaline solution as described in U.S. Pat. No. 5,624,626. Within the broader scope of the present invention, other cleaning methods and possibly cleaning along with accomplishing other benefits such as activating the surface, possibly pitting the surface somewhat, or otherwise chemically treating the surface could be used. Further, such steps as degreasing, possibly with trichlorides could be used, in combination with rinses (e.g. with an alcohol rinse ). The usual contaminants would be dirt, oil and greases which should be removed and also the oxides should be removed as much as possible.

With regard to etching this step requires the correct acid or combination of acids for the material in the right concentrations for the correct time. As the concentration of acid drops below a practical working limit of approximately 5%, the time required can become so long that it is not suitable industrially.

In general, organic acids have not been found to be suitable. The acids which have worked best are hydrochloric acid, hydrofluoric acid, sulfuric acid and combinations of the same. Also, in some instances nitric acid is used in combination with hydrochloric and/or hydrofluoric acid. Also, some acids work well with particular cermets than others. For example, hydrochloric acid or sulfuric acid will etch the surface of titanium carbonitride. Superior results may be obtained by the two in combination. These acids will not effect titanium carbide. Titanium carbide etches with a combination of hydrofluoric and nitric acids. Either acid alone will have little or a weak effect. For etching aluminum oxide, hydrofluoric or a combination of hydrofluoric and hydrochloric acid has been found suitable.

The acid bath works well at room temperature and when slightly warm. As the acid gets too hot it creates hazards, which makes its use in industrial applications undesirable.

With regard to the application of the metallic coating material, cobalt has been found to be particularly effective, and nickel, zinc, copper and silver could also be used, as well as combinations of these metals.

The preferred method of application of the metallic coating material is by electroplating, as described above. Also, the ceramic part could simply be plated by an electroless process.

When cobalt is used as the metallic coating material with electrolysis, various solutions could be used, such as ammonium cobalt sulfate, cobalt chloride or combinations thereof. If nickel is used as the metallic coating material, then the plating solution could be nickel sulfate, ammonium nickel sulfate, combinations thereof or other such compounds.

EXAMPLE 1

Step One—Cleaning

Twenty saw tips composed of TiCN (titanium carbonitride ceramic) for use on a circular saw plate are obtained. Upon visual inspection, the surfaces of the tips are relatively free of pitting and include some contaminants, such as carbonized oils, free carbon, iron oxide, general dust, shop contaminats and metal particles. The saw tips are immersed in a bath of a 15 percent by volume sodium hydroxide solution and connected as a cathode in an electrolytic cell. Stainless steel is connected as an anode. The sodium hydroxide bath is maintained at room temperature, approximately 70–80 degree(s) F. Six (6) volts are imposed across the electrolytic cell for two (2) minutes. The tips are removed from the bath. Upon microscopic inspection (1000×), the surface is clean but smooth and relatively unpitted. In addition, the surfaces of the tips are substantially free of contaminants.

Step 2 Surface Etching

The part is immersed in a solution for an etching effect. One such solution is 20% Hydrochloric acid solution (HCl) solution or other depending on the material and other considerations such as cost and safety.

Temperature—ambient 70°–80° F.

Time 5 minutes

This process may be accelerated or enhanced by the use of electric current, higher temperature or different combinations of chemicals.

Step 3 Deposition of Cobalt or Other Metal

The parts to be treated are connected to the negative side of the rectifier. An anode such as stainless steel is used.

A 17.5% solution of Ammonium Cobalt Sulfate $(NH_4)_2Co(SO_4)_2$ in water is used. Other cobalt compounds, such a Cobalt Chloride and Cobalt Sulfate, may be used and compounds based on other metals such as Titanium may also be used.

Temperature—ambient 70°–80° F.

Current density of 5–150 amps/sq. ft. depending on the solution with 5–15 amps being most common.

pH 5 to 5.5

Time is a variable depending on the thickness of coating desired and the number and size of the parts.

Cobalt or other appropriate anode may be used to replenish the bath,

Step 4 Post Cleaning of the Parts

The parts may be post cleaned by dipping in a solution such as 20% HCl for 30 to 60 seconds.

Once this process is performed that parts may then be brazed on saws using standard braze alloys and will work successfully in sawing and other applications.

EXAMPLE 2

Example 1 is repeated except the material is Titanium Carbide and the etchant is Nitric acid, Hydrofluoric acid and water in a 1:1:1 ratio.

EXAMPLE 3

Example 1 is repeated except the material is Alumina with a Titanium Carbide addition and the etchant is Nitric acid, Hydrofluoric acid and water in a 1:1:1 ratio.

EXAMPLE 4

Examples 1,2 & 3 are repeated except the plating solution is Cobalt Chloride.

EXAMPLE 5

Examples 1,2 & 3 are repeated except the plating solution is Cobalt Sulfate.

EXAMPLE 6

Examples 1,2 & 3 are repeated except the plating solution is Nickel Sulfate.

EXAMPLE 7

Examples 1,2 & 3 are repeated except the plating solution is Ammonium Nickel Sulfate.

EXAMPLE 8

Examples 1,2 & 3 are repeated except the plating solution is Zinc based.

EXAMPLE 9

Examples 1,2 & 3 are repeated except the plating solution is based on other metals.

EXAMPLE 10

Examples 1,2 & 3 are repeated except the plating process is electroless.

EXAMPLE 11

The tips from Examples 1–10 are rinsed in water and allowed to air dry. Then, silver solder is applied to a surface of each tip. The solder flows smoothly across the surface to cover the surface. The saw tips are adhered by the solder to a circular saw plate. The joint between each saw tip and the circular saw plate is strong. Upon visual inspection two weeks after the tips have been treated according to the method of the present invention, the tips have not discolored. Upon impact testing the steel saw body will rip or the ceramic will rupture before the braze joint fails.

EXAMPLE 12

For purposes of comparison, examples 1–10 are repeated, eliminating the first cleaning process. Then, silver solder is applied to a surface of each tip. The silver solder flows across the surface of the tips, but without complete coverage. The saw tips are adhered by the solder to the circular saw plate. The joint between each saw tip and the circular saw plate is somewhat strong, but much weaker than the joint in Example 11. Upon visual inspection two weeks after the tips have been treated according to the method of the present invention, the tips have not discolored.

EXAMPLE 13

Also for purposes of comparison, examples 1–10 are repeated, eliminating the etching process. Then, silver solder is applied to a surface of each tip. The silver solder flows across the surface of the tips, but without complete coverage. The saw tips are adhered by the solder to the circular saw plate. The joint between each saw tip and the circular saw plate is somewhat strong, but not as strong as the joint in Example 11. Upon visual inspection two weeks after the tips have been treated according to the method of the present invention, the tips have not discolored.

EXAMPLE 14

Again for purposes of comparison examples 1–10 are repeated, eliminating the plating process. Then, silver solder is applied to a surface of each tip. The silver solder flows across the surface of the tips, but without complete coverage. There is most typically a balling of the braze alloy and the ball may be removed with finger pressure. If the saw tips are brazed to the steel plate, the joint between each saw tip and the circular saw plate is somewhat strong, but not as strong as the joint in Example 11. The joint is usually strong enough to hold the tips to the steel body if no force is applied. The tips typically fall off in shipping or may be plucked off by hand. In all cases the tips are readily "shucked off" as soon as any cutting is attempted. Upon visual inspection two weeks after the tips have been treated according to the method of the present invention, the tips have not discolored.

EXAMPLE 15

Examples 1–10 are repeated with three (3) volts imposed across the electrolytic cell for three (3) minutes in the plating step set forth. Then, silver solder is applied to a surface of each tip. The solder flows smoothly across the surface to cover the surface. The saw tips are adhered by the solder tote circular saw plate. The joint between each saw tip and the circular saw plate is strong. Upon visual inspection two weeks after the tips have been treated according to the method of the present invention; the tips have not discolored.

EXAMPLE 16

Examples 1–10 are repeated with a 10 percent by volume etchant solution used. Then, silver solder is applied to a surface of each tip. The solder flows smoothly across the surface to cover the surface. The saw tips are adhered by the solder to the circular saw plate. The joint between each saw tip and the circular saw plate is strong. Upon visual inspection two weeks after the tips have been treated according to the method of the present invention, the tips have not discolored.

EXAMPLE 17

Examples 1–10 are repeated. Two weeks later, silver solder is applied to a surface of each tip. The solder flows smoothly across the surface to cover the surface. The saw tips are adhered by the solder to the circular saw plate. The joint between each saw tip and the circular saw plate is strong. In addition, the tips have not discolored.

EXAMPLE 18

For purposes of comparison, twenty saw tips composed of ceramic (Titanium Carbonitride TiCN) for use on a circular saw plate are obtained. Upon microscopic inspection, the surfaces of the tips are relatively free of pitting and include some contaminants, such as carbonized oils, free carbon, iron oxide, and metal particles. Silver solder is applied to a surface of each saw tip. The solder does not flow smoothly across the surface of each saw tip, but instead a globule of solder is formed on each saw tip. The saw tips are adhered by the solder to the circular saw plate. Some of the joints between the saw tips and the circular saw plate are weaker than the joints formed with the tips treated according to the method of the present invention.

When the untreated tips were processed in accordance with the present invention brazed on a saw they fell off during shipping to the test site. The treated tips brazed with a strong joint so that impact testing destroyed either the saw tip or ripped the steel saw plate but the braze joints did not fail.

EXAMPLE 19

Saw tips are prepared as in steps one through ten. Then silver braze alloy is not applied. Instead, the saw tips are welded to the steel saw body without braze alloy.

The plated parts are placed in contact with the steel saw body and then they are heated using induction heating, a torch, resistance heating or other method common to the industry. The plating on the saw tips and the saw body flow together and for a join by a process commonly known as welding in the industry.

What is claimed is:

1. A method of joining a ceramic body to a substrate wherein said ceramic body has a ceramic bonding surface and said substrate has a substrate bonding surface, said method comprising:
    a) providing the bonding surface of the ceramic body as a clean surface which is substantially free of contaminants;
    b) etching the bonding surface of the ceramic body;
    c) applying to the ceramic bonding surface a coating of a metallic material capable of being applied as a surface layer to the ceramic bonding surface and being bonded to ceramic bonding surface;
    d) then in normal atmospheric air bonding the ceramic body to the substrate by:
        i) placing the bonding surfaces of the ceramic body and the substrate against one another with a brazing material therebetween and bonding these to one another by a brazing process, said coating material comprising at least in part cobalt;

ii) placing the bonding surfaces of the ceramic body and the substrate against one another and welding these.

2. The method as recited in claim 1, comprising cleaning the ceramic bonding surface by electro cleaning.

3. The method as recited in claim 1, wherein cleaning is accomplished by immersing the bonding surface of the ceramic body in an electrolytic solution and connecting the ceramic body to one of two electrodes in the electrolytic solution, passing an electric current between the electrodes.

4. The method as recited in claim 1, wherein said metallic coating material comprises at least in part a metal that is selected from a group comprising cobalt, nickel, zinc, copper, silver and combinations thereof.

5. The method as recited in claim 4, wherein said coating material comprises at least in part comprises cobalt.

6. The method as recited in claim 4, wherein said coating material comprises at least in part nickel.

7. The method as recited in claim 4, wherein said coating material comprises at least in part zinc.

8. The method as recited in claim 4, wherein said metallic coating material comprises at least in part copper.

9. The method as recited in claim 4, wherein said metallic coating material comprises at least in part silver.

10. The method as recited in claim 1, wherein the applications of the metallic coating material is accomplished by electrolysis.

11. The method as recited in claim 1, wherein the application of the metallic coating material is accomplished by an electroless process.

12. The method as recited in claim 1, wherein said ceramic body comprises a metal based ceramic.

13. The method as recited in claim 1, wherein said ceramic body comprises:
   a) titanium, aluminum, tungsten, silicon and/or combinations thereof; and
   b) carbon, nitrogen, oxygen, and/or combinations thereof.

14. The method as recited in claim 1, wherein said ceramic body comprises titanium, aluminum and/or combinations thereof.

15. The method as recited in claim 1, wherein said ceramic body comprises titanium carbide, tungsten carbide, titanium carbonitride, titanium nitride, aluminum oxide, and/or combinations thereof.

16. The method as recited in claim 1, wherein said ceramic body is a saw tip, and said substrate is a saw blade.

17. The method as recited in claim 1, wherein said ceramic body is a ceramic body used in drills, shapers, wear parts, scrapers, ovens, kilns, and/or jet exhausts.

18. The method as recited in claim 1, wherein the bonding is accomplished by brazing.

19. The method as recited in claim 1, wherein the bonding is accomplished by welding.

20. The method as recited in claim 1, wherein applying the coating of a metallic material to the ceramic bonding surface is done without prior catalyzing of the bonding surface of the ceramic body.

21. The method as recited in claim 1, wherein applying the coating of a metallic material to the ceramic bonding surface is done without prior catalyzing of the bonding surface of the ceramic body by palladium or a palladous compound.

22. A method of treating a ceramic body having a ceramic bonding surface so that the ceramic body can be effectively brazed to a substrate, said method comprising:
   a) providing the bonding surface of the ceramic body as a clean surface which is substantially free of contaminants;
   b) etching the bonding surface of the ceramic body;
   c) applying to the ceramic bonding surface a coating of a metallic material capable of bonding as a surface layer to the ceramic bonding surface;
   whereby said bonding surface coated with said metallic coating material is capable of being brazed or welded to said substrate by a brazing or welding process in normal atmospheric air to provide an effective bonding of the ceramic body to the substrate.

23. A method of joining a ceramic body to a substrate wherein said ceramic body has a ceramic bonding surface and said substrate has a substrate bonding surface, said method comprising:
   a) providing the bonding surface of the ceramic body as a clean surface which is substantially free of contaminants;
   b) etching the bonding surface of the ceramic body;
   c) applying to the ceramic bonding surface a coating of a metallic material capable of being applied as a surface layer to the ceramic bonding surface and being bonded to ceramic bonding surface, said coating material comprising at least in part cobalt;
   d) then bonding the ceramic body to the substrate by;
      i) placing the bonding surfaces of the ceramic body and the substrate against one another with a brazing material therebetween and bonding these to one another by a brazing process;
      ii) placing the bonding surfaces of the ceramic body and the substrate against one another and welding these.

24. A method of joining a ceramic body to a substrate wherein said ceramic body has a ceramic bonding surface and said substrate has a substrate bonding surface, said method comprising:
   a) providing the bonding surface of the ceramic body as a clean surface which is substantially free of contaminants;
   b) etching the bonding surface of the ceramic body;
   c) applying to the ceramic bonding surface a coating of a metallic material capable of being applied as a surface layer to the ceramic bonding surface and being bonded to ceramic bonding surface, said coating material comprising at least in part zinc;
   d) then bonding the ceramic body to the substrate by;
      i) placing the bonding surfaces of the ceramic body and the substrate against one another with a brazing material therebetween and bonding these to one another by a brazing process;
      ii) placing the bonding surfaces of the ceramic body and the substrate against one another and welding these.

25. A method of joining a ceramic body to a substrate wherein said ceramic body has a ceramic bonding surface and said substrate has a substrate bonding surface, said method comprising:
   a) providing the bonding surface of the ceramic body as a clean surface which is substantially free of contaminants;
   b) etching the bonding surface of the ceramic body;
   c) applying to the ceramic bonding surface by electrolysis a coating of a metallic material capable of being applied as a surface layer to the ceramic bonding surface and being bonded to ceramic bonding surface;
   d) then bonding the ceramic body to the substrate by;
      i) placing the bonding surfaces of the ceramic body and the substrate against one another with a brazing material therebetween and bonding these to one another by a brazing process, or;

ii) placing the bonding surfaces of the ceramic body and the substrate against one another and welding these.

26. A method of joining a ceramic body to a substrate wherein said ceramic body has a ceramic bonding surface and said substrate has a substrate bonding surface, said method comprising:

a) providing the bonding surface of the ceramic body as a clean surface which is substantially free of contaminants, said ceramic body comprising titanium carbide, tungsten carbide, titanium carbonitride, titanium nitride, aluminum oxide and/or combinations thereof;

b) etching the bonding surface of the ceramic body;

c) applying to the ceramic bonding surface a coating of a metallic material capable of being applied as a surface layer to the ceramic bonding surface and being bonded to ceramic bonding surface;

d) then bonding the ceramic body to the substrate by;
i) placing the bonding surfaces of the ceramic body and the substrate against one another with a brazing material therebetween and bonding these to one another by a brazing process, or;
ii) placing the bonding surfaces of the ceramic body and the substrate against one another and welding these.

27. A method of joining a ceramic body to a substrate wherein said ceramic body has a ceramic bonding surface and said substrate has a substrate bonding surface, said method consisting essentially of:

a) providing the bonding surface of the ceramic body as a clean surface which is substantially free of contaminants;

b) etching the bonding surface of the ceramic body;

c) applying to the ceramic bonding surface a coating of a metallic material capable of being applied as a surface layer to the ceramic bonding surface and being bonded to ceramic bonding surface;

d) then bonding the ceramic body to the substrate by:
i) placing the bonding surfaces of the ceramic body and the substrate against one another with a brazing material therebetween and bonding these to one another by a brazing process, or;
ii) placing the bonding surfaces of the ceramic body and the substrate against one another and welding these.

28. A method of joining a ceramic body to a substrate wherein said ceramic body has a ceramic bonding surface and said substrate has a substrate bonding surface, said method comprising:

a) providing the bonding surface of the ceramic body as a clean surface which is substantially free of contaminants;

b) etching the bonding surface of the ceramic body;

c) applying directly to the ceramic bonding surface a coating of a metallic material capable of being applied as a surface layer to the ceramic bonding surface and being bonded to ceramic bonding surface;

d) then bonding the ceramic body to the substrate by:
i) placing the bonding surfaces of the ceramic body and the substrate against one another with a brazing material therebetween and bonding these to one another by a brazing process, or;
ii) placing the bonding surfaces of the ceramic body and the substrate against one another and welding these.

* * * * *